(12) United States Patent
Castro

(10) Patent No.: US 6,802,717 B2
(45) Date of Patent: Oct. 12, 2004

(54) TEACHING METHOD AND DEVICE

(76) Inventor: Felix Castro, 3165 Mountain View Ave., Los Angeles, CA (US) 90066

( * ) Notice: Subject to any disclaimer, the term of this patent is extended or adjusted under 35 U.S.C. 154(b) by 373 days.

(21) Appl. No.: 10/127,995

(22) Filed: Apr. 23, 2002

(65) Prior Publication Data

US 2002/0160342 A1 Oct. 31, 2002

Related U.S. Application Data

(60) Provisional application No. 60/286,835, filed on Apr. 26, 2001.

(51) Int. Cl.[7] .............................................. G09B 5/00
(52) U.S. Cl. ...................... 434/169; 434/88; 434/163; 434/307 R; 345/173
(58) Field of Search ....................... 434/88, 156, 159, 434/161–169, 307 R, 308, 362, 365; 345/169, 173, 179, 180, 187, 189; 382/187–189; 704/254, 255

(56) References Cited

U.S. PATENT DOCUMENTS

| | | | | |
|---|---|---|---|---|
| 3,662,077 A | * | 5/1972 | Kersten | 434/163 |
| 4,669,986 A | * | 6/1987 | Yokoyama | 434/164 |
| 4,878,844 A | * | 11/1989 | Gasper et al. | 434/159 |
| 5,302,132 A | * | 4/1994 | Corder | 434/156 |
| 5,408,250 A | * | 4/1995 | Bier | 345/169 |
| 6,146,146 A | * | 11/2000 | Koby-Olson | 434/159 |
| 6,215,901 B1 | * | 4/2001 | Schwartz | 382/186 |
| 6,393,398 B1 | * | 5/2002 | Imai et al. | 704/254 |
| 2002/0076684 A1 | * | 6/2002 | Blevins et al. | 434/322 |

* cited by examiner

Primary Examiner—Joe H. Cheng

(57) ABSTRACT

A method of teaching writing and the alphabet using an electronic teaching device like a laptop computer having a touch screen for displaying a selected letter, a video screen for displaying an exemplary object with a name using the letter, and a speaker for delivering selected audio messages in connection with the displays on the touch screen and the video screen, wherein the selected letter is displayed and identified, the sequential strokes in creating the letter are shown in broken lines with directional indicators on the touch screen and traced by the user, the completed strokes are shown in solid lines, a representative object is displayed, and audio instructions are given for the object with the pronunciation of the letter and the name of the object.

17 Claims, 6 Drawing Sheets

Figure 1:
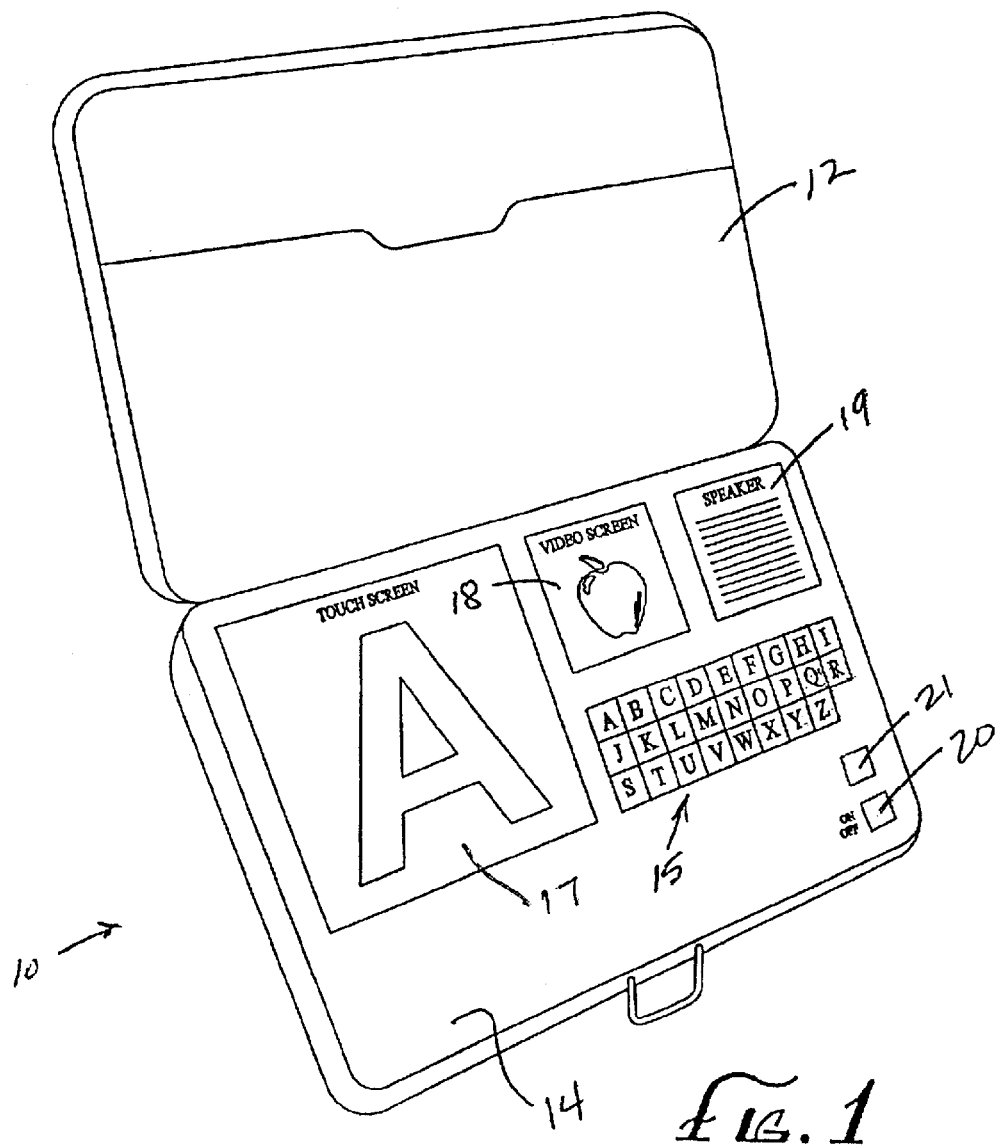

|  |
|---|
| FIG. 2A |
| FIG. 2B |
| FIG. 2C |
| FIG. 2D |
| FIG. 2E |

FIG. 2

FIG. 2A

| STEP 1<br>KEYBOARD | STEP 2<br>WRITING SCREEN | | STEP 3<br>SPEAKER MESSAGE | STEP 4<br>VIDEO SCREEN |
|---|---|---|---|---|
| A (a) | 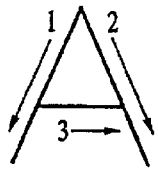 | 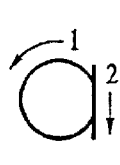 | THIS IS THE LETTER A(a). THE LETTER A(a) SAYS A-A-A, AS IN APPLE, APPLE, APPLE | APPLE PICTURE |
| B (b) | 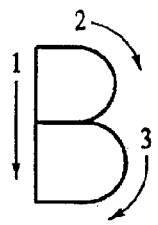 | 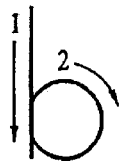 | THIS IS THE LETTER B(b). THE LETTER B(b) SAYS BUH, BUH, BUH, AS IN BALL, BALL, BALL | BALL PICTURE |
| C (c) | 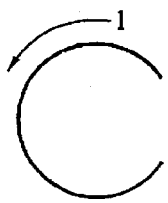 |  | THIS IS THE LETTER C(c). THE LETTER C(c) SAYS CUH, CUH, CUH, AS IN CAT, CAT, CAT | CAT PICTURE |
| D (d) | 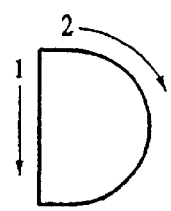 | 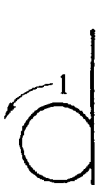 | THIS IS THE LETTER D(d). THE LETTER D(d) SAYS DUH, DUH, DUH, AS IN DOG, DOG, DOG | DOG PICTURE |

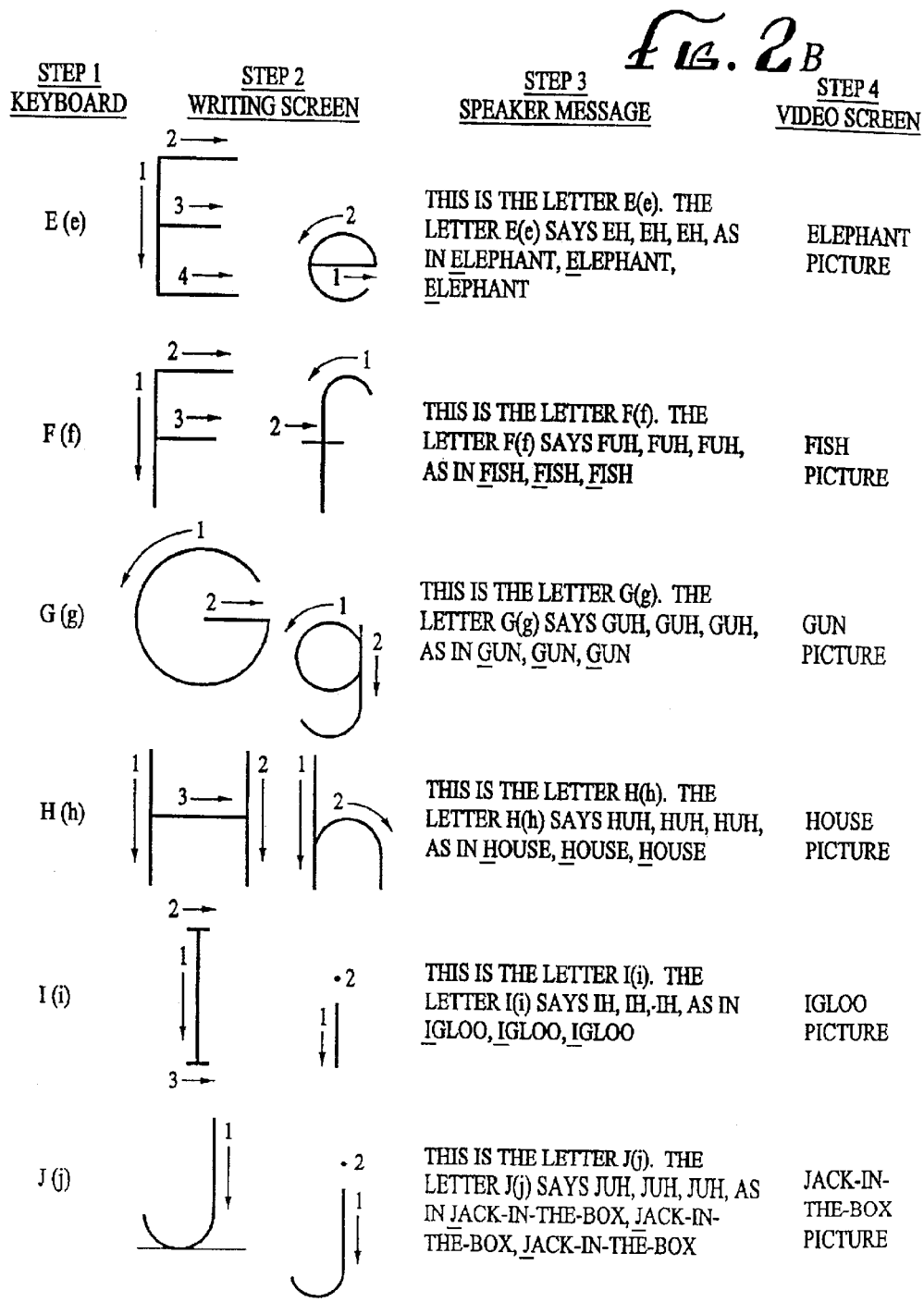

FIG. 2c

| STEP 1 KEYBOARD | STEP 2 WRITING SCREEN | STEP 3 SPEAKER MESSAGE | STEP 4 VIDEO SCREEN |
|---|---|---|---|
| K (k) | | THIS IS THE LETTER K(k). THE LETTER K(k) SAYS KUH, KUH, KUH, AS IN KING, KING, KING | KING PICTURE |
| L (l) | | THIS IS THE LETTER L(l). THE LETTER L(l) SAYS LUH, LUH, LUH, AS IN LION, LION, LION | LION PICTURE |
| M (m) | | THIS IS THE LETTER M(m). THE LETTER M(m) SAYS M-M-M, AS IN MOON, MOON, MOON | MOON PICTURE |
| N (n) | | THIS IS THE LETTER N(n). THE LETTER N(n) SAYS NUH, NUH, NUH, AS IN NEST, NEST, NEST | NEST PICTURE |
| O (o) | | THIS IS THE LETTER O(o). THE LETTER O(o) SAYS AH, AH, AH, AS IN OCTOPUS, OCTOPUS, OCTOPUS | OCTOPUS PICTURE |
| P (p) | | THIS IS THE LETTER P(p). THE LETTER P(p) SAYS PUH, PUH, PUH, AS IN PIG, PIG, PIG | PIG PICTURE |

FIG. 2E

| STEP 1 KEYBOARD | STEP 2 WRITING SCREEN | STEP 3 SPEAKER MESSAGE | STEP 4 VIDEO SCREEN |
|---|---|---|---|
| W (w) | 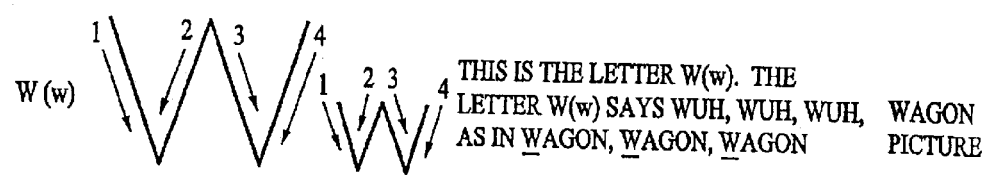 | THIS IS THE LETTER W(w). THE LETTER W(w) SAYS WUH, WUH, WUH, AS IN WAGON, WAGON, WAGON | WAGON PICTURE |
| X (x) | 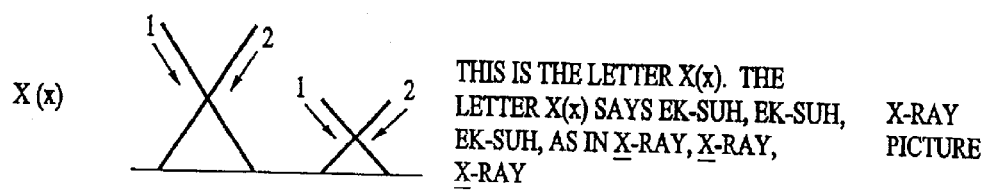 | THIS IS THE LETTER X(x). THE LETTER X(x) SAYS EK-SUH, EK-SUH, EK-SUH, AS IN X-RAY, X-RAY, X-RAY | X-RAY PICTURE |
| Y (y) | 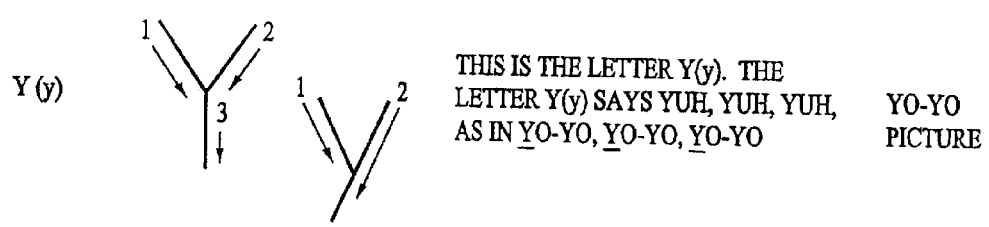 | THIS IS THE LETTER Y(y). THE LETTER Y(y) SAYS YUH, YUH, YUH, AS IN YO-YO, YO-YO, YO-YO | YO-YO PICTURE |
| Z (z) | 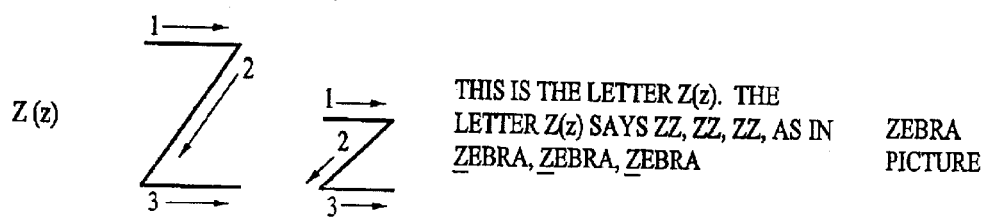 | THIS IS THE LETTER Z(z). THE LETTER Z(z) SAYS ZZ, ZZ, ZZ, AS IN ZEBRA, ZEBRA, ZEBRA | ZEBRA PICTURE |

TEACHING METHOD AND DEVICE

REFERENCE TO PRIOR APPLICATIONS

This application claims the benefit of copending provisional application No. 60/286,835, filed Apr. 26, 2001.

BACKGROUND OF THE INVENTION

This invention relates to the teaching of writing and has particular reference to an electronic method and device for teaching young children to write the characters of the alphabet, or other characters. As used herein, "alphabet" refers to the letters used to produce words, and is illustrated in connection with the English language. It is to be understood, however, that the invention is adaptable to use with other characters, including non-English, numbers, and even entire words.

The use of phonics has become widely recognized as a preferred approach to the teaching of children and others to read, and a variety of educational tools have been devised to assist in the teaching of phonics, that is, the sounding of letters of the alphabet. Of course, the writing of the letters of the alphabet also is taught in various ways, usually involving an explanation and demonstration by an instructor, followed by practice by the student in creating the letters in written form, usually with a writing instrument such as a pen or pencil on a surface such as paper or a blackboard. Through practice, the student learns to write, and also to pronounce and use, the letters of the alphabet.

The objective of this invention is to provide a relatively simple and easy-to-use teaching method and device for teaching writing and the alphabet, and other terms and characters, in a new and improved manner.

BRIEF DESCRIPTION OF THE INVENTION

The present invention resides in a method of teaching writing, vocabulary and the alphabet using an electronic teaching device that has a keyboard for selecting the term or character to be written, hereinafter referred to simply as "character", at least one screen area for displaying the selected character, a speaker for delivering selected audio messages with the display of selected characters, and a second screen area for displaying selected picture of an article with the delivery of a selected concluding audio message. The teaching device has electronic controls and software of conventional construction and operation for causing the character to be displayed, an introductory audio message to be delivered through the speaker identifying the character, a series of sequential outline elements to appear on the screen representing the strokes to be used for writing the character, and delivery of the concluding audio message while displaying a picture of an exemplary article on the second screen area.

For optimum teaching effectiveness, the first screen area is a writing screen that also is a "touch screen", that is, it has the capability of sensing the touch of the user's finger in following the sequential outline elements. The method includes the additional steps of providing audio messages instructing the user in following the outline elements, confirming through the writing screen that the sequence has been followed, and preferably replacing the initial outline elements, which may be dotted or broken lines, with completed solid lines. The concluding audio message preferably identifies the character, instructs in its phonetic pronunciation, and provides a word-identification of the picture of the exemplary article, thereby not only illustrating the character but also enhancing the user's vocabulary. In dealing with the alphabet, of course, the character is a selected letter and the picture is of an object whose name illustrates the use and pronunciation of the letter.

Figure 2D:
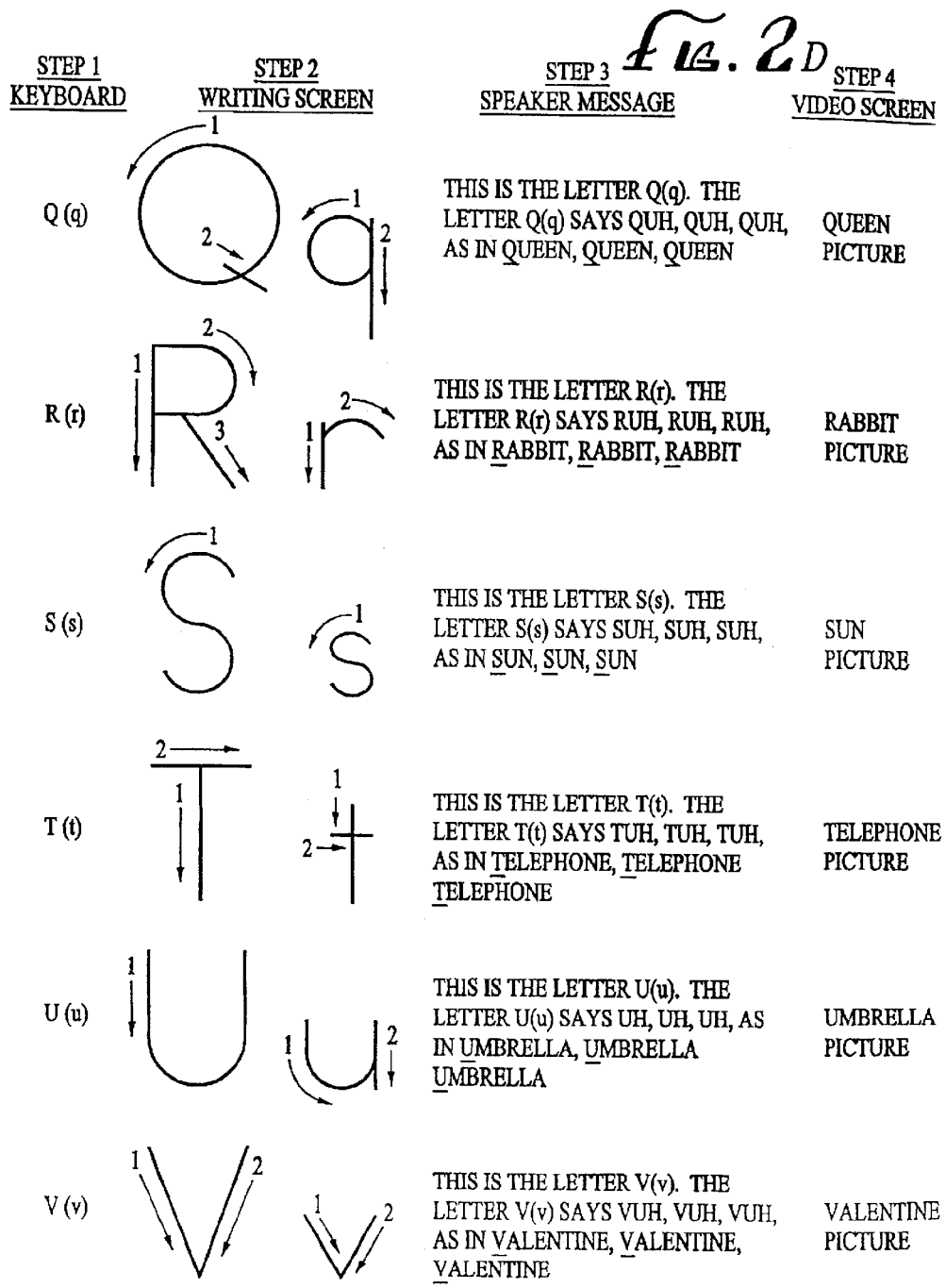

Other aspects and advantages of the invention will become apparent from the following detailed description, taken in conjunction with the accompanying drawings, in which:

FIG. 1 is a top perspective view of a teaching device for teaching the alphabet in accordance with the present invention, shown with a hinged cover in an open position and with representative illustrations displayed on two screen areas which are separate screens; and FIG. 2 is a five-sheet drawing (2A, 2B, 2C, 2D and 2E) containing a full exemplary description of the four principal steps of the preferred embodiment of the invention, applied to each letter of the alphabet.

DETAILED DESCRIPTION OF THE PREFERRED MODE

Shown in FIG. 1 for purposes of illustration is an electronic teaching device, indicated generally by the reference number 10, having a body 11, a hinged cover 12, a carrying handle 13 and a front face 14 with a number of components similar to components of a laptop computer. These are: (1) a keyboard 15 having a key for each character to be illustrated, herein the letters of the alphabet from "A" to "Z"; a main or "writing" screen 17 herein labeled as a "TOUCH SCREEN" and capable of sensing the touch of a user's finger, as will be described; a "VIDEO SCREEN" 18 for displaying a graphic representation or picture of an article; a "SPEAKER" 19, only the face of which is shown, for delivering audio messages; and control switches 20 and 21.

The internal operating components (not shown) of the teaching device 10 are entirely conventional electronic components, including software, for implementing the steps of the method of the invention in the manner that is to be described. These components are completely within the capabilities of those skilled in the art and are not shown or described herein, except for their operating capabilities.

The method of the invention is to be described in connection with the teaching of writing of the characters or letters of the alphabet, and it will be seen that the keyboard 15 has twenty-six keys that are marked with the letters "A" through "Z", herein from left to right and in three descending rows, for simplicity, and located in the right-central portion of the front face 14. The main screen 17 herein is on the upper left, the smaller video screen 18 is just to its right, and the speaker 19 is in the upper right corner, although these locations are not important. The two switches 20 and 21 preferably are on the lower right corner portion of the front face 14 of the device.

The display of the letter "A" on the main screen 17 is illustrative of what happens in response to the first step of the method, which is selection of a character by activation of one of the keys on the keyboard. The display of an object on the video screen 18, herein an apple, is illustrative of what happens in the fourth step, after the user has engaged in an instructional exercise in step two, and heard an instructional message from the speaker in step 3. The specific sequence of these occurrences will be apparent from the detailed illustration of the teaching of the alphabet in FIG. 2, and specifically the first or "A" element of FIG. 2A.

As indicated in FIG. 2A under "Step 1, Keyboard," the first step, after provision of the necessary teaching device, is the selection of a character on the keyboard 15. This is shown as producing both an upper case "A" and a lower case "a", but these can be separated into two different programs, if desired. The character initially appears on the main or "writing" screen 17, and is accompanied by an audio message from the speaker 19, saying "This is the letter A (a)." Note that this message is listed under "Step 3", but preferably is concurrent with the display in "Step 1."

At this point, the user has received both visual and auditory instruction as to the nature of the character for which instruction was selected. The next step, "Step 2A" in FIG. 2, is to display the components, lines or elements of the character sequentially in the preferred order for the user to create the letter, representing the sequence of strokes to be made by the user. For the letter "A," it will be seen that there are three such strokes, down to the left, down to the right, and across, as numbered. These strokes preferably are shown first by a travelling broken or dotted line going sequentially in the directions of the arrows, and each such line may be accompanied by an audio message such as "Follow the dots with your finger." When the user performs this on the touch-sensitive screen, the device preferably replaces the dotted line with a solid line, and displays the sequential element for the next stroke, with the same audio message. When all of the outline elements have been traced by the user, a congratulatory audio message preferably is given, such as "Very good!" The solid-line letter may begin to flash on and off on the writing screen as this message is given.

The next steps in the method of the invention, which preferably are executed concurrently, are the delivery of an audio message through the speaker 19 identifying the selected letter and instructing as to its pronunciation, and also providing a word identifying an object and constituting an example of the use of the letter. This provides a material example for completing the child's comprehension of the use and pronunciation of the letter, and an association with the exemplary object. This also contributes to the growth of the user's vocabulary.

As shown under "Step 3" in FIG. 2A for the letter "A(a)", the speaker message provides the sound, followed by the name of the object, herein the word "apple." At the same time, a picture of an apple is displayed on the video screen, which is shown as a separate screen but could be combined in one screen with the writing screen, simply as a second area.

The same steps may be performed for the lower case letter "a," illustrated as requiring only two strokes. In all other respects the sequence of steps may be the same. Illustrative speaker messages are provided in FIG. 2 for all of the letters of the alphabet, along with the recommended strokes for all of the letters. These illustrative strokes are generally accepted as the proper strokes for learning to create each letter, but may be modified to suit any particular need. Similarly, the passages listed under "Step 3, Speaker Message," are recommended as appropriate pronunciation instruction and names for illustrative objects, but both the names and the representations of the objects may be varied in accordance with the techniques of a particular teacher.

The two switches 20 and 21 are simply illustrative, one 20 preferably being an "on-off" switch and the other 21 being for another use, such as selecting "lower case" and "upper case" modes of operation or activating a recorded musical message such as the "Alphabet Jingle." This can be used as a concluding message that summarizes the subject matter covered.

From the foregoing, it will be evident that the method and device of the present invention will be effective to provide not only visual and auditory instruction for the user but also tactile instruction in tracing the elements of each character on the writing screen. The effect is a highly effective, yet simple, teaching method and device.

I claim as my invention:

1. The method of teaching the alphabet comprising the steps of:

providing an electronic teaching device having a keyboard with keys for the letters of the alphabet, a touch screen area for displaying each letter in response to actuation of the key for that letter, a speaker for delivering selected recorded audio messages with the display of a selected letters, and a second screen area for displaying a selected picture of an object with the delivery of a selected audio message;

causing a letter to be displayed on said touch screen area in response to the actuation of the key for that letter, and concurrently causing an introductory audio message to be delivered that identifies the selected letter;

causing the selected letter to disappear from the touch screen and causing a series of outline elements to appear sequentially representing the sequence of strokes to be used for writing the letter, and concurrently causing intermediate audio messages to be delivered that instruct the user to follow the series of outline elements;

delivering a concluding audio message through the speaker identifying the selected letter, instructing in its phonetic pronunciation and providing an exemplary word identifying an object constituting an example of the use of the letter;

and simultaneously displaying on said second screen area a picture of the object that is identified by the word provided in the concluding audio message.

2. The method as defined in claim 1 wherein the series of outline elements is caused to appear in the form of a travelling broken outline for each element of the selected letter, with indicators for a direction of travel for the user to create each such element.

3. The method as defined in claim 2 wherein the touch screen area is provided with the capability of sensing the touch of the user's finger in following each element of the series of broken outline elements, and including the further step of replacing each such element with a solid outline of the element in response to tracing of the outline element by the user.

4. The method as defined in claim 3 including the further step of providing an audio message through the speaker upon the successful tracing by the user of each of the outline elements of a letter.

5. The method defined in claim 1 in which the letter is caused to be displayed in both upper case and lower case forms, and the following steps are directed to both of said forms.

6. The method defined in claim 1 in which the letter is caused to be displayed in upper case form, and the following steps are directed to the upper case form.

7. The method of teaching writing comprising the steps of:

providing an electronic teaching device having a keyboard for selecting the character to be written, at least one screen for displaying the character in response to selection of the character on the keyboard, a speaker for delivering selected audio messages with the display of selected terms, and a second screen area for displaying a selected picture of an exemplary object with the delivery of a selected audio message;

causing a term to be displayed on said screen in response to selection of the character on said keyboard, and concurrently causing an introductory audio message to be delivered that identifies the selected character;

causing a series of outline elements to appear sequentially on the screen representing the strokes to be used for writing the character;

and delivering a concluding audio message through the speaker identifying the character.

8. The method as defined in claim 7 including the further step of causing the character to disappear after being displayed on the screen, and replacing the character with said series of outline elements.

9. The method as defined in claim 8 including the further step of causing intermediate audio messages to be delivered that instruct the user in following the series of outline elements.

10. The method as defined in claim 7 in which the step of delivering the concluding audio message includes the step of instructing in the pronunciation of the character.

11. The method as defined in claim 7 wherein the characters are letters of the alphabet.

12. The method as defined in claim 7 including the further step of causing intermediate audio messages to be delivered that instruct the user in following the series of outline elements.

13. The method as defined in claim 12 wherein the series of outline elements is a series of broken outline elements, and wherein the screen is provided as a touch screen with the capability of sensing the touch of the user's finger in following each element of the series, and including the further step of replacing each element with a solid outline of the element in response to tracing of the broken element by the user.

14. An electronic teaching device having:

an alphabet keyboard having keys for the letters "A" through "Z";

a first screen for displaying a letter in response to activation of a selected key on said keyboard, and displaying sequential instructions for creating the letter;

a speaker for delivering a recorded audio message along with the display of a selected letter, identifying the letter, giving its pronunciation and providing an example of a word identifying an object and containing the selected letter; and a second screen for displaying pictures of articles identified by the words that are displayed with the letter, whereby a user may select a letter and be instructed in the creation and pronunciation of the letter and association of the letter with a word and an object identified by the word.

15. An electronic teaching device as defined in claim 14 wherein said first screen is a touch screen.

16. An electronic teaching device as defined in claim 15 having operating software for causing a selected letter to be displayed on said touch screen in response to activation of a selected key on the keyboard, causing an introductory audio message to be delivered through said speaker identifying the selected letter, causing a series of outline elements to appear on said touch screen sequentially representing the sequence of strokes for writing the selected letter, delivering a concluding audio message through the speaker instructing in the pronunciation of the letter and providing an exemplary word identifying an object constituting an example of the use of the letter, and causing the display on the second screen of the object.

17. An electronic teaching device as defined in claim 16 in which said software further causes the delivery of an intermediate audio message instructing the user to touch and trace the outline elements on the touch screen, and provides an additional audio message through the speaker upon the successful tracing by the user of each of the outline elements.

* * * * *